(12) United States Patent
Ashford

(10) Patent No.: US 8,358,333 B2
(45) Date of Patent: Jan. 22, 2013

(54) PHOTOGRAMMETRY MEASUREMENT SYSTEM

(75) Inventor: Curtis M. Ashford, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/040,833

(22) Filed: Mar. 4, 2011

(65) Prior Publication Data
US 2012/0224030 A1 Sep. 6, 2012

(51) Int. Cl.
*H04N 13/02* (2006.01)
*G06K 9/00* (2006.01)
(52) U.S. Cl. .......................................... 348/47; 382/154
(58) Field of Classification Search .................. 348/50, 348/208.12, 208.14, 47, 46; 382/154
See application file for complete search history.

(56) References Cited

U.S. PATENT DOCUMENTS

| | | | | |
|---|---|---|---|---|
| 6,374,198 | B1* | 4/2002 | Schifa et al. ........................ | 703/2 |
| 2005/0117215 | A1* | 6/2005 | Lange ............................ | 359/462 |
| 2010/0085423 | A1* | 4/2010 | Lange ............................. | 348/46 |
| 2011/0001793 | A1* | 1/2011 | Moriyama et al. ............... | 348/46 |
| 2011/0199335 | A1* | 8/2011 | Li et al. ........................... | 345/175 |

OTHER PUBLICATIONS

Atwater et al., "The Measurement and Modeling of a World War I Mark IV Tank Using CLR and CCD Camera-Line Scanning Systems in an Outside Environment", pp. 1-9, retrieved Jan. 20, 2011 http://metrology.survice.com/mark_4_tank.pdf.
Fabio, "From Point Cloud to Surface: The Modeling and Visualization Problem", International Archives of the Photogrammetry, Remote Sensing and Spatial Information Sciences, vol. XXXIV-5/W10, International Workshop on Visualization and Animation of Reality-based 3D Models, Feb. 2003, Switzerland, pp. 1-11.
Maas et al., "Photogrammetric Techniques in Civil Engineering Material Testing and Structure Monitoring", Photogrammetric Engineering & Remote Sensing, Jan. 2006, vol. 72, No. 1, pp. 39-45.
Hampel et al., "Application of Digital Photogrammetry for Measuring Deformation and Cracks DuringLoad Tests in Civil Engineering Material Testing", Optical 3-D 2003, pp. 2-9.

* cited by examiner

*Primary Examiner* — Behrooz Senfi
(74) *Attorney, Agent, or Firm* — Yee & Associates, P.C.

(57) ABSTRACT

A method and apparatus for making measurements. Images of an object are generated. A plurality of coordinates for a plurality of points on a surface of the object is identified from the images using a number of reference points in the images. A first portion of the plurality of points on the object is visible on the object in the images. A second portion of the plurality of points on the object is visible on a number of mirror units in the images.

19 Claims, 10 Drawing Sheets

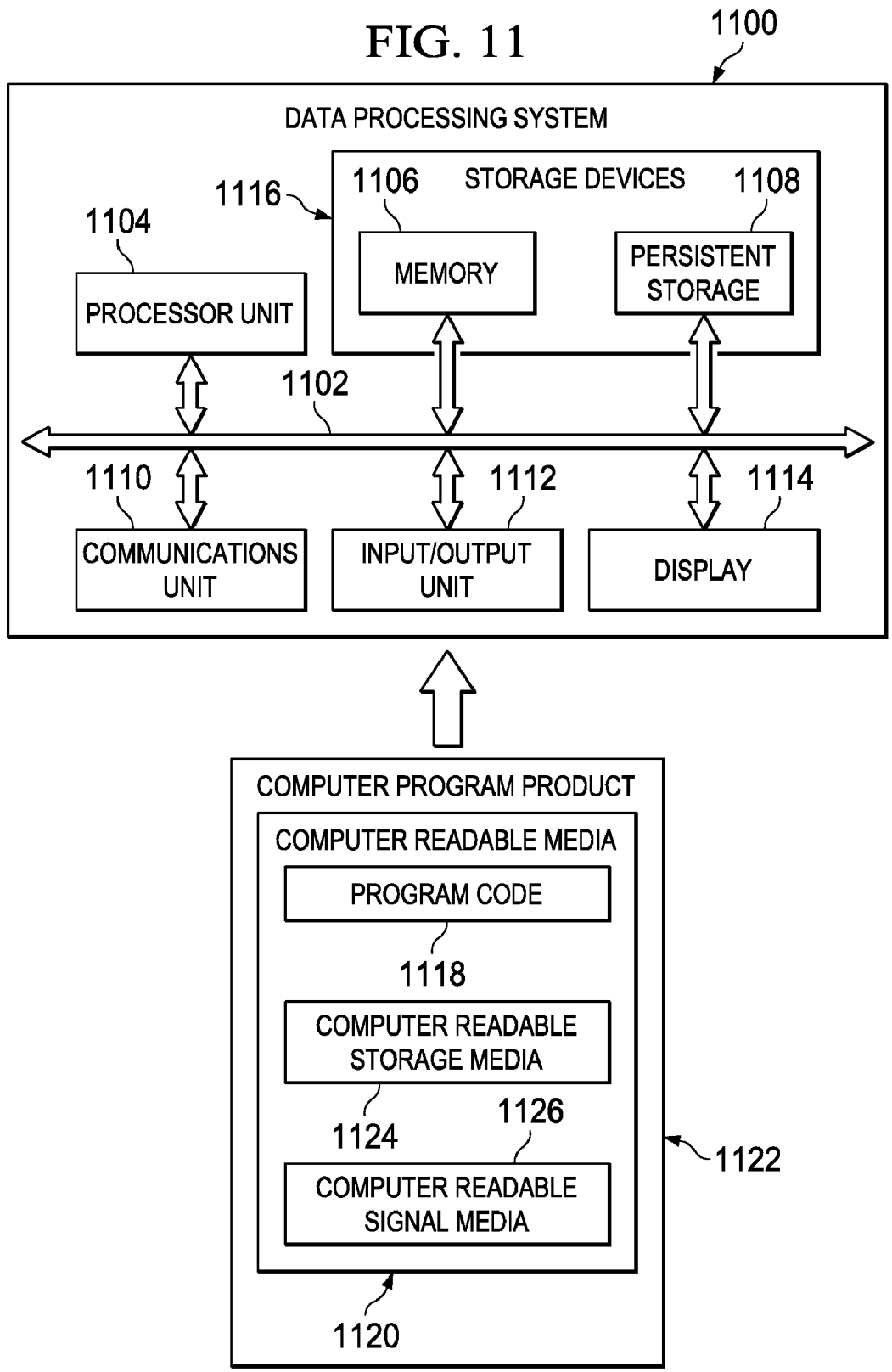

PHOTOGRAMMETRY MEASUREMENT SYSTEM

BACKGROUND INFORMATION

1. Field:

The present disclosure relates generally to measurements and, in particular, to measuring objects. Still more particularly, the present disclosure relates to a method and apparatus for identifying coordinates of objects in images.

2. Background:

Photogrammetry is a three-dimensional coordinate measurement technique. This technique uses photographs as a medium to make measurements. With photogrammetry, triangulation is used to identify coordinates of objects. Images of an object are generated from at least two different locations to points on an object. Each point on the object is a location on the object. The lines from these locations to the points on the object may also be referred to as lines of sight or rays. These lines of sight may be processed mathematically to identify three-dimensional coordinates for the points on the object.

With photogrammetry, images are generated using camera systems. Typically, the camera systems have two or more cameras at different locations. The cameras are located at the locations from which lines of sight are identified to point on an object. With the images generated by the cameras, three-dimensional information, such as a three-dimensional location of points, is identified.

The mathematic processing in photogrammetry involves using triangulation to identify three-dimensional coordinates for points in the images. The different cameras provide lines of sight to the different points that may converge in space. With images of an object containing the points, a line of sight may be identified from each camera to the points on the object. If the location of the camera and the aiming direction is known, the lines of sight may be used to identify three-dimensional coordinates for each point.

In generating images for identifying coordinates for points on an object, the camera system is positioned such that any given point on the object can be seen by both of the cameras in the camera system at the point in time the image of the object is generated. Further, additional images may be generated for use in increasing accuracy of measurements.

When points on an object are hidden from the view of the camera system, measurements of these points cannot be made. In some cases, not all of the points of interest for measurements on an object can be seen from the camera system from any one position.

One solution involves moving the camera system to another location such that the cameras are positioned to generate images of the points that were hidden from view in the first location. Although this type of process provides coordinates for the desired points, additional time and calculations are needed when the camera system is moved from one location to another location.

Therefore, it would be advantageous to have a method and apparatus that takes into account at least one of the issues discussed above, as well as other possible issues.

SUMMARY

In one advantageous embodiment, an apparatus comprises a number of mirror units, a number of cameras, and a measurement module. The number of mirror units is configured to be positioned relative to an object. The number of cameras is configured to generate images of the object and the number of mirror units in which a plurality of points on the object is present in the images. A first portion of the plurality of points on the object is on the object in the images. A second portion of the plurality of points on the object is visible on the number of mirror units in the images. The measurement module is configured to identify a plurality of coordinates for the plurality of points using the images, a plurality of positions for the number of cameras relative to the object, a number of reference points in the images, and a number of positions for the number of mirror units. The plurality of coordinates for the plurality of points on the object are used to form a substantially spatially correct point cloud for the object.

In another advantageous embodiment, a method is provided for making measurements. Images of an object are generated. A plurality of coordinates for a plurality of points on a surface of the object is identified from the images using a number of reference points in the images. A first portion of the plurality of points on the object is visible on the object in the images. A second portion of the plurality of points on the object is visible on a number of mirror units in the images.

An apparatus comprising a number of mirror units, a number of cameras, and a measurement module. The number of mirror units is configured to be positioned relative to an object. The number of cameras is configured to generate images of the object and the number of mirror units. A plurality of points on the object is present in the images. The measurement module is configured to identify a plurality of coordinates for the plurality of points using a number of reference points in the images. A first portion of the plurality of points on the object is visible on the object in the images. A second portion of the plurality of points on the object is visible on the number of mirror units in the images.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 11 is an illustration of a data processing system in accordance with an advantageous embodiment.

DETAILED DESCRIPTION

Figure 1:
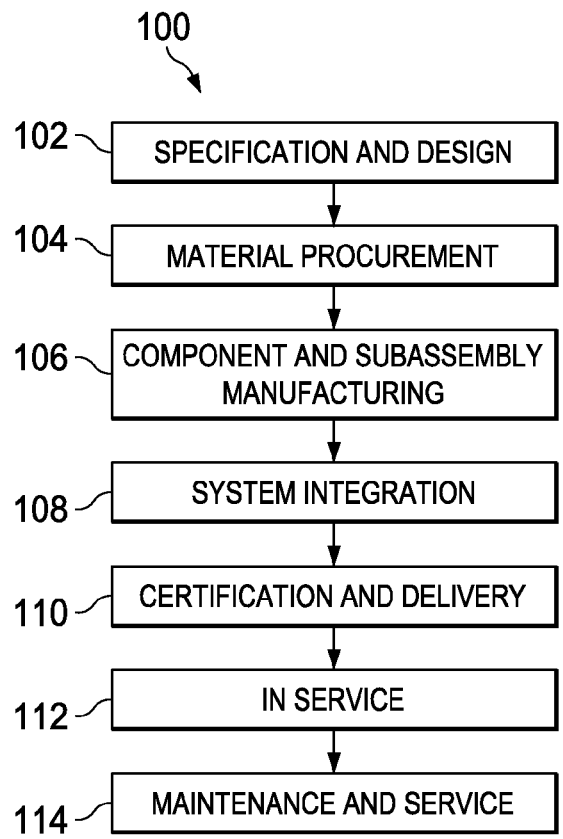
FIG. 1 is an illustration of an aircraft manufacturing and service method in accordance with an advantageous embodiment.
Figure 2:
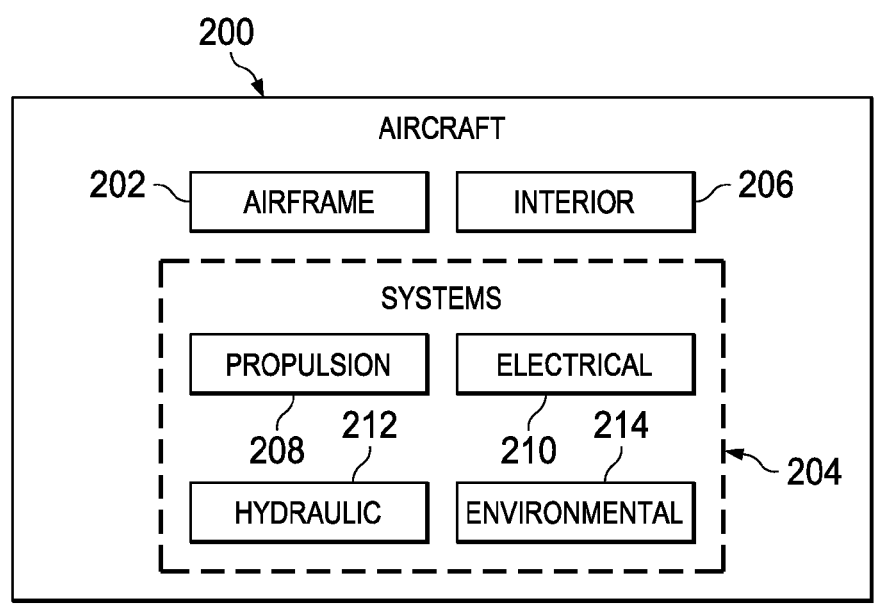
FIG. 2 is an illustration of an aircraft in which an advantageous embodiment may be implemented.

Referring more particularly to the drawings, embodiments of the disclosure may be described in the context of an aircraft manufacturing and service method 100 as shown in FIG. 1 and an aircraft 200 as shown in FIG. 2. Turning first to FIG. 1, an illustration of an aircraft manufacturing and service method is depicted in accordance with an advantageous embodiment. During pre-production, the aircraft manufacturing and service method 100 may include a specification and design 102 of the aircraft 200 in FIG. 2 and a material procurement 104.

During production, a component and subassembly manufacturing 106 and a system integration 108 of the aircraft 200 in FIG. 2 takes place. Thereafter, the aircraft 200 in FIG. 2 may go through a certification and delivery 110 in order to be placed in service 112. While in service 112 by a customer, the aircraft 200 in FIG. 2 is scheduled for routine maintenance and service 114, which may include modification, reconfiguration, refurbishment, and other maintenance or service.

Each of the processes of the aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 2, an illustration of an aircraft is depicted in which an advantageous embodiment may be implemented. In this example, the aircraft 200 is produced by the aircraft manufacturing and service method 100 in FIG. 1 and may include an airframe 202 with a plurality of systems 204 and an interior 206. Examples of the systems 204 include one or more of a propulsion system 208, an electrical system 210, a hydraulic system 212, and an environmental system 214. Any number of other systems may be included. Although an aerospace example is shown, different advantageous embodiments may be applied to other industries, such as the automotive industry.

Apparatuses and methods embodied herein may be employed during at least one of the stages of the aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example may also include item A, item B, and item C, or item B and item C.

In one illustrative example, components or subassemblies produced in the component and subassembly manufacturing 106 in FIG. 1 may be fabricated or manufactured in a manner similar to components or subassemblies produced while the aircraft 200 is in service 112 in FIG. 1. These components may be measured using one or more of the different advantageous embodiments. As yet another example, a number of apparatus embodiments, method embodiments, or a combination thereof may be utilized during production stages, such as the component and subassembly manufacturing 106 and the system integration 108 in FIG. 1.

A number, when referring to items, means one or more items. For example, a number of apparatus embodiments may be one or more apparatus embodiments. A number of apparatus embodiments, method embodiments, or a combination thereof may be utilized while the aircraft 200 is in service 112 and/or during the maintenance and service 114 in FIG. 1. The use of a number of the different advantageous embodiments may substantially expedite the assembly of and/or reduce the cost of the aircraft 200.

For example, measurements of points on objects may be made during one or more of these stages using the different advantageous embodiments. The objects may be the aircraft 200 and/or any components of the aircraft 200. The advantageous embodiments may be used to identify the location of points on objects in three dimensions. With the identification of these points using the different advantageous embodiments, measurements may be made of the points for the object. For example, point clouds may be generated for an object. The point clouds may then be used to determine whether different points on the object meet desired manufacturing and/or testing parameters, tolerances, or other desired values.

The different advantageous embodiments recognize and take into account that one solution may be to move the part and/or the camera system to different positions to generate images for all points on the object. However, this type of procedure may take more time and/or effort than is desirable. As yet another solution, a number of measurement probes and/or the camera system may be moved around the part to generate measurements for the points on the object. Using this type of measurement system may also take more time, effort, and more calculations than is desirable.

The different advantageous embodiments recognize and take into account that one solution that does not require moving the camera systems may be to use mirrors when generating images of the objects. For example, the mirror may be placed in a position such that the camera is able to generate an image including the points hidden from view. In other words, the different advantageous embodiments recognize and take into account that the mirror may be positioned such that the image generated from the mirror includes points on the object that does not have a direct line of sight from the camera.

Thus, the advantageous embodiments provide a method and apparatus for making measurements. In making measurements, coordinates are identified for points on an object. With the identification of coordinates for these points on the object, measurements may be made for the object. These measurements may be used to determine whether the object meets a policy or some rules or criteria for the object.

In one advantageous embodiment, an apparatus comprises a number of mirror units, a number of cameras, and a measurement module. The number of mirror units is configured to be positioned relative to the object. The number of cameras is configured to generate images of the object and the number of mirror units in which a plurality of points on the object is present in the images. A first portion of the plurality of points may be visible on the object in the image, while a second portion of the plurality of points in the images is hidden. The second portion of the plurality of points is visible in the number of mirror units in the images. The measurement module is configured to identify a location of the plurality of points using the images, the plurality of positions for the number of cameras, and a number of positions for the number of mirror units.

Figure 3:
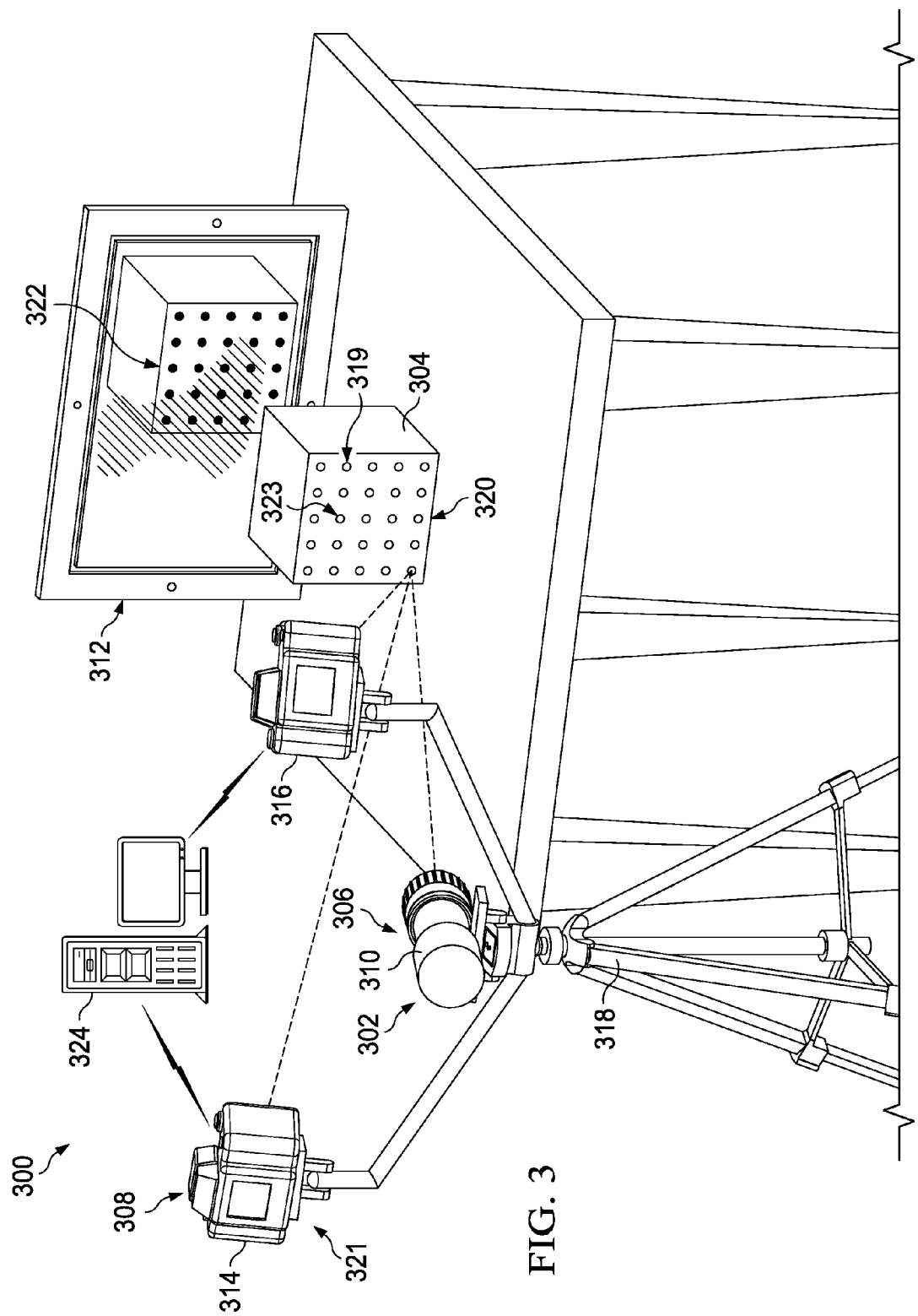
FIG. 3 is an illustration of a measurement environment in accordance with an advantageous embodiment.

With reference now to FIG. 3, an illustration of a measurement environment is depicted in accordance with an advantageous embodiment. In this illustrative example, a measurement environment 300 comprises a measurement system 302. The measurement system 302 is used to make measurements of an object 304. In these examples, the measurement system 302 takes the form of a photogrammetry system 306.

As depicted, the photogrammetry system 306 comprises a camera system 308, a scanner 310, and a mirror unit 312. The camera system 308 includes a first camera 314 and a second camera 316. The first camera 314, the second camera 316, and the scanner 310 are associated with a frame 318.

A first component, such as the first camera 314, may be considered to be associated with a second component, such as the frame 318, by being secured to the second component, bonded to the second component, fastened to the second component, and/or connected to the second component in some other suitable manner. The first component may also be connected to the second component using a number of other components. The first component may also be considered to be associated with the second component by being formed as part of and/or an extension of the second component.

In these illustrative examples, the photogrammetry system 306 is used to measure points 320 on the object 304. The scanner 310 may project dots 319 onto the object 304 in the locations of the points 320 on the object 304 for which measurements are to be made. The dots 319 are dots formed using coherent light from the scanner 310. The dots 319 are just one illustrative example of markers that may be used to identify the locations of the points 320 in images generated by the photogrammetry system 306.

In other words, a dot is projected onto the object 304 at each location of a point on the object 304 for which measurements are to be made. In this manner, the dots 319 make the points 320 on the object 304 visible to the camera system 308.

In these illustrative examples, the scanner 310 may take the form of a laser scanning system configured to project the dots 319 onto the object 304.

In this illustrative example, the object 304 has a visible portion 323 of the points 320 on the object 304 and a hidden portion 322 of the points 320 on the object 304 relative to a current position 321 of the camera system 308. For example, the visible portion 323 of the points 320 on the object 304 is visible to the camera system 308 when the camera system 308 is in the current position 321. In other words, the camera system 308 has a direct line of sight to each point in the visible portion 323 of the points 320 on the object 304. In this manner, both the first camera 314 and the second camera 316 can generate images that include the visible portion 323 of the points 320 on the object 304.

Further, the hidden portion 322 of the points 320 on the object 304 is hidden from the camera system 308 when the camera system 308 is in the current position 321. In other words, the camera system 308 does not have a direct line of sight to any point in the hidden portion 322 of the points 320 on the object 304. In this illustrative example, the first camera 314 and the second camera 316 are unable to generate images that show the dots 319 on the hidden portion 322 of the points 320 on the object 304 without using, for example, the mirror unit 312.

In these illustrative examples, the mirror unit 312 is positioned such that an image includes the mirror unit 312. The image with the mirror unit 312 includes a reflection of the hidden portion 322 of the points 320 on the object 304 in the images generated by the first camera 314 and the second camera 316. In the different illustrative examples, the mirror unit 312 may be any object capable of providing a reflection. In other words, the mirror unit 312 may be any object capable of providing a reflection of the object 304 that may be captured in the images generated by the first camera 314 and the second camera 316.

In this manner, the frame 318 with the camera system 308 and the scanner 310 does not need to be moved or repositioned to generate images for the hidden portion 322 of the points 320 on the object 304.

In these illustrative examples, the images generated by the camera system 308 are sent to a computer 324. The computer 324 may then analyze the images and identify coordinates for the points 320 on the object 304. Further, the computer 324 may analyze the coordinates for the different points on the object 304 to make measurements for the object 304.

Figure 4:
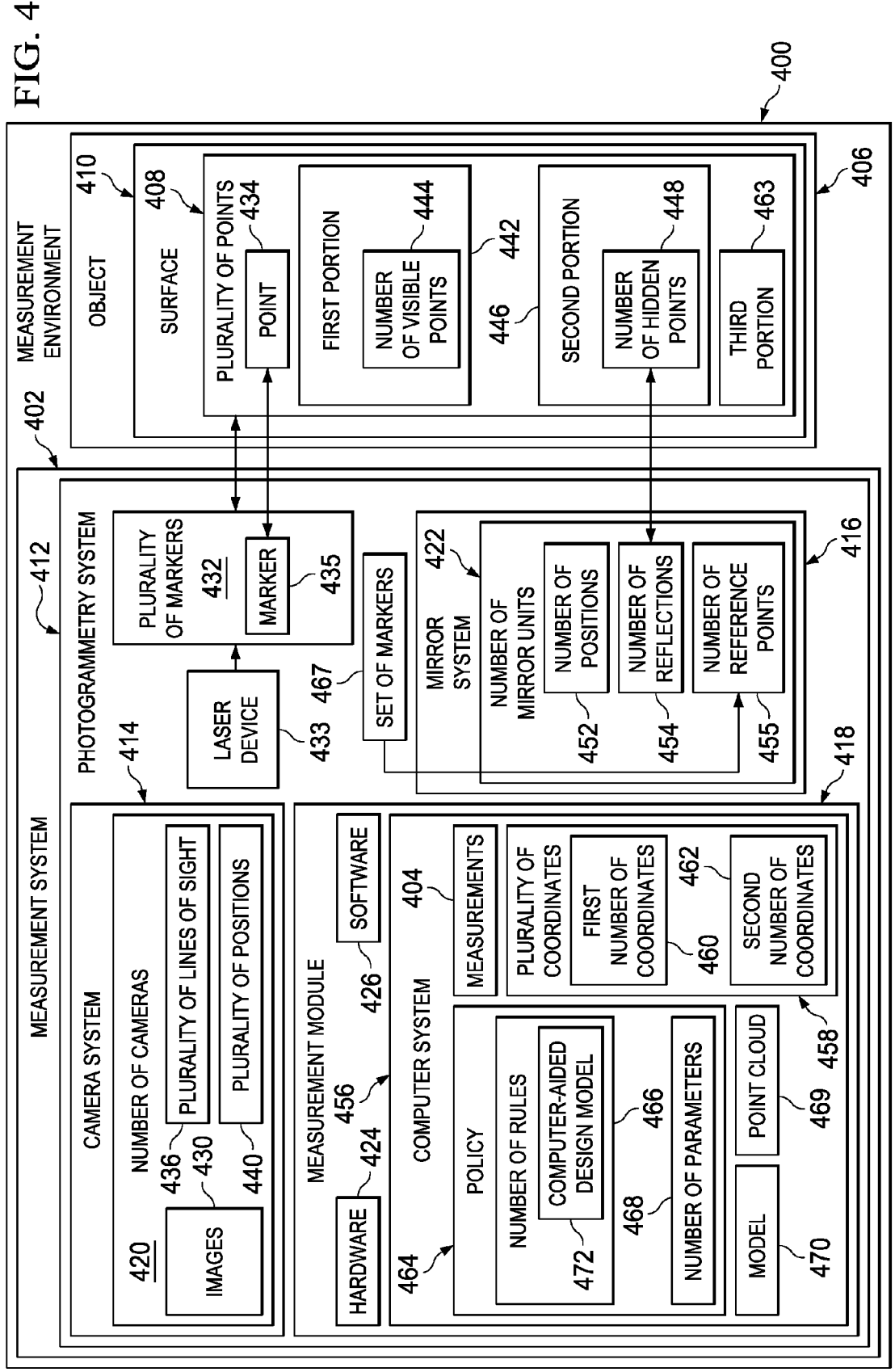
FIG. 4 is an illustration of a measurement environment in accordance with an advantageous embodiment.

With reference to FIG. 4, an illustration of a measurement environment is depicted in accordance with an advantageous embodiment. The measurement environment 300 in FIG. 3 is an example of one implementation for a measurement environment 400 in FIG. 4. In this depicted example, the measurement environment 400 comprises a measurement system 402. The measurement system 402 makes measurements 404 of an object 406. In particular, the measurement system 402 makes the measurements 404 for a plurality of points 408 on the object 406.

In these examples, the plurality of points 408 is located on a surface 410 of the object 406. In other words, each point in the plurality of points 408 is at a particular location on the surface 410 of the object 406.

In particular, the measurement system 402 takes the form of a photogrammetry system 412. In this example, the photogrammetry system 412 comprises a camera system 414, a mirror system 416, and a measurement module 418. The camera system 414 is comprised of a number of cameras 420. The measurement module 418 takes the form of hardware 424, software 426, or a combination of the two. The mirror system 416 is comprised of a number of mirror units 422.

In these illustrative examples, the number of cameras 420 generates images 430 of the object 406. The images 430 are sent to the measurement module 418. The measurement module 418 in turn generates the measurements 404 for the plurality of points 408 on the surface 410 of the object 406.

The plurality of points 408 may be identified in a number of different ways. For example, the plurality of points 408 may be identified using a plurality of markers 432. The plurality of markers 432 are visible markers positioned on the plurality of points 408. In this manner, the plurality of markers 432 make the plurality of points 408 visible in the images 430.

In these illustrative examples, the plurality of markers 432 may be generated on the plurality of points 408 using a laser device 433. The laser device 433 may also be referred to as a laser projection system. In particular, the laser device 433 may be configured to project the plurality of markers 432 on the plurality of points 408 on the surface 410 of the object 406. For example, the laser device 433 may be used to project the plurality of markers 432 in the form of dots on the plurality of points 408 on the surface 410 of the object 406.

In other illustrative examples, the plurality of markers 432 may be physical markers, such as paint, stickers, objects, or other suitable types of items that may be placed on the surface 410 of the object 406. In this manner, the plurality of points 408 on the surface 410 of the object 406 may be seen in the images 430 generated by the camera system 414.

As one illustrative example, a marker 435 in the plurality of markers 432 may be projected onto a point 434 in the plurality of points 408 on the surface 410 of the object 406. The marker 435 on the point 434 is present in the images 430 generated by the camera system 414.

In these illustrative examples, the number of cameras 420 may have a plurality of positions 440 relative to the object 406. For example, when the number of cameras 420 is one camera, the camera is used to generate an image in the images 430 of the object 406 in one position in the plurality of positions 440. Then, the camera may be moved from the position in the plurality of positions 440 to another position in the plurality of positions 440 to generate another image in the images 440 of the object 406. In this manner, the camera may be moved to the different positions in the plurality of positions 440 to generate the images 430.

As another example, the camera may be maintained in one position in the plurality of positions 440 while the object 406 is moved into different positions at which the images 430 are generated. For example, the object 406 may be rotated into a different position and/or moved from one position to another position. In this manner, when the number of cameras 420 is one camera, the camera has different positions relative to the object 406 when the camera and/or the object 406 are moved.

Additionally, when the number of cameras 420 is two or more cameras, the two or more cameras may be placed in the plurality of positions 440 to generate the images 430 from the plurality of positions 440. In this manner, movement of the two or more cameras 420 to different positions may be unnecessary.

The number of cameras 420 has a plurality of lines of sight 436 from the plurality of positions 440 to the point 434 on the object 406 in these examples. In other words, in these illustrative examples, each of the plurality of lines of sight 436 is a line extending from one of the plurality of positions 440 for the number of cameras 420 to the point 434.

In these illustrative examples, a first portion 442 of the plurality of points 408 on the object 406 may be visible on the object 406 in the images 430. The first portion 442 of the plurality of points 408 is a number of visible points 444 on the object 406. The number of visible points 444 includes the points on the object 406 that are in a direct view of the number of cameras 420. In other words, each of the number of cameras 420 has a direct line of sight to the number of visible points 444 on the object 406 when in one of the plurality of positions 440. In this manner, the number of visible points 444 is visible on the object 406 in the images 430.

The second portion 446 of the plurality of points 408 on the object 406 is visible on the number of mirror units 422 in the images 430. The second portion 446 of the plurality of points 408 is a number of hidden points 448 on the object 406. The number of hidden points 448 on the object 406 includes the points on the object 406 that are not in a direct view of the number of cameras 420. In other words, a line of sight from any camera in the number of cameras 420 from a position in the plurality of positions 440 to any hidden point in the number of hidden points 448 is absent or not present.

In this manner, the number of hidden points 448 on the object 406 are not visible on the object 406 in the images 430. However, the number of hidden points 448 on the object 406 is visible on the number of mirror units 422 in the images 430. In particular, a number of reflections 454 of the number of hidden points 448 is visible on the number of mirror units 422 and in the images 430.

In other words, plurality of lines of sight 436 are only present between the plurality of positions 440 of the number of cameras 420 to the number of visible points 444. The plurality of lines of sight 436 is absent or not present between the plurality of positions 440 of the number of cameras 420 to the number of hidden points 448.

Instead, the number of mirror units 422 may have a number of positions 452 such that the number of hidden points 448 can be seen in the images 430. For example, the images 430 generated by the number of cameras 420 include the number of mirror units 422. In the images 430, the number of mirror units 422 shows the number of reflections 454. The number of reflections 454, in these illustrative examples, shows the number of hidden points 448. As a result, the number of hidden points 448 can be seen directly in the images 430.

In these illustrative examples, the measurement module 418 may take the form of a computer system 456. The measurement module 418 is configured to identify a plurality of coordinates 458 for the plurality of points 408 on the object 406. The measurement module 418 identifies a first number of coordinates 460 for the number of visible points 444 and a second number of coordinates 462 for the number of hidden points 448.

Depending on the implementation, the identification of the plurality of coordinates 458 may be performed without needing to move the camera system 414 or any other components in the photogrammetry system 412.

However, in some cases, a third portion 463 of the plurality of points 408 may not be visible in the images 430 on the object 406 or on the number of mirror units 422. In these cases, the object 406 may be moved and/or rotated to change the plurality of positions 444 of the number of cameras 420 relative to the object 406. The object 406 may be moved and/or rotated such that the third portion 463 of the plurality of points 408 may be visible in the images 430, generated by the number of cameras 420, on at least one of the object 406 and the number of mirror units 422.

In this manner, additional coordinates may be identified in the plurality of coordinates 458 for the third portion 463 of the plurality of points 408 on the object 406. As a result, the plurality of coordinates 458 for substantially all portions of the surface 410 of the object 406 may be identified.

In these illustrative examples, each coordinate in the plurality of coordinates 458 is a three-dimensional coordinate. The plurality of coordinates 458 may be based on a Cartesian coordinate system, a spherical coordinate system, or some other type of three-dimensional coordinate system. In these illustrative examples, a Cartesian coordinate system with x, y, and z coordinates is used.

The plurality of coordinates 458 may be identified using a number of reference points 455 in the images 430. The number of reference points 455 allows the second number of coordinates 462 for the number of hidden points 448 to be identified.

In particular, the reference points in the number of reference points 455 for a mirror unit in the number of mirror units 422 may be used to identify the coordinates for a plane through the mirror unit. In other words, the number of reference points 455 allows the location of the number of mirror units 422 to be identified relative to the object 406 such that the second number of coordinates 462 for the number of hidden points 448 seen in the number of reflections 454 for the number of mirror units 422 may be identified.

In some cases, reference points in the number of reference points 455 for a mirror unit may be used to define the plane for the mirror unit. The number of reference points 455 may include points on the number of mirror units 422, points on a structure or object around the number of mirror units 422, and/or other suitable points.

For example, in these illustrative examples, the number of reference points 455 may be on a number of frames for the number of mirror units 422. In other illustrative examples, the number of reference points 455 may be on a number of structures around the number of mirror units 422. As one example, when reference points in the number of reference points 455 are on a number of structures around a mirror unit in the number of mirror units 422, the number of structures may have known positions relative to the mirror unit. In other words, the positions of the number of structures relative to a plane through the mirror unit may be known.

In these illustrative examples, the number of reference points 455 may be visible in the images 430. For example, a set of markers 467 may be positioned on the number of reference points 455 to make the number of reference points 455 visible in the images 430.

The set of markers 467 may include, for example, without limitation, dots projected onto the number of reference points 455 by the laser device 433, pieces of tape applied to the number of mirror units, paint, tooling balls, and/or other suitable types of markers that may be used to cause the number of reference points 455 to be visible in the images 430. In some cases, the plurality of markers 432 projected in the form of dots by the laser device 433 may include the set of markers 467. In this manner, the plurality of markers 432 may include markers on the object 406 and markers for the number of mirror units 422.

With the plurality of coordinates 458, the measurement module 418 may make additional measurements. For example, the measurement module 418 may compare the plurality of coordinates 458 with a policy 464. The policy 464 includes a number of rules 466.

Additionally, the policy 464 may also include a number of parameters 468 used in applying the number of rules 466. In these illustrative examples, the measurement module 418 applies the policy 464 to the plurality of coordinates 458. The number of rules 466 may be, for example, without limitation, desired ranges for locations of the plurality of points 408, desired ranges for distances between selected portions of the plurality of points 408, and/or other suitable types of rules.

Further, the measurement module 418 may form a point cloud 469 using the plurality of coordinates 458 for the plurality of points 408. The point cloud 469 may be a substantially spatially correct point cloud. The plurality of coordinates 458 may form a set of vertices in a coordinate system for the surface 410 of the object 406.

When the point cloud 469 is substantially spatially correct, points in the point cloud 469 have substantially same locations as corresponding points in the plurality of points 408 on the object 406 when the points in the point cloud 469 are aligned with the corresponding points in the plurality of points 408 on the object 406. The points in the point cloud 469 may be aligned with corresponding points in the plurality of points 408 on the object 406 by being superimposed on the plurality of points 408, in one illustrative example.

In other words, when the point cloud 469 is placed over or overlaid on the plurality of points 408 on the object 406, the points in the point cloud 469 are in substantially the same location as the points in the plurality of points 408. In this manner, each point in the point cloud 469 for the object 406 corresponds to a point in the plurality of points 408 on the object 406 in a substantially spatially correct manner.

With the point cloud 469, a model 470 of the object 406 may be formed. The model 470 may be used in making measurements of the object 406. For example, the policy 464 may be applied to the model 470. For example, a rule in the number of rules 466 may identify a computer-aided design model 472. The model 470 may be compared to the computer-aided design model 472. Differences between the computer-aided design module 472 and the model 470 may be identified for use in determining whether the object 406 meets the policy 464.

The illustration of the measurement environment 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, although the different advantageous embodiments have been described with respect to making measurements of objects, the different advantageous embodiments may also be used for other purposes. For example, once measurements have been made for the plurality of points 408 to identify the plurality of coordinates 458 for the surface 410 of the object 406, these coordinates may be used to make the model 470 for other purposes, other than making measurements to determine whether the object 406 meets the policy 464.

For example, the model 470 may be used to generate additional objects from the object 406. In other words, the object 406 may form a physical model for making other objects. As another illustrative example, the model 470 may be used in making animations.

In these illustrative examples, the object 406 may take various forms. For example, without limitation, the object 406 may be the aircraft 200 in FIG. 2, an engine, a wing, a wheel, a spar, a chair, a tool, a mold, a person, the ground, or some other suitable type of object 406.

Figure 5:
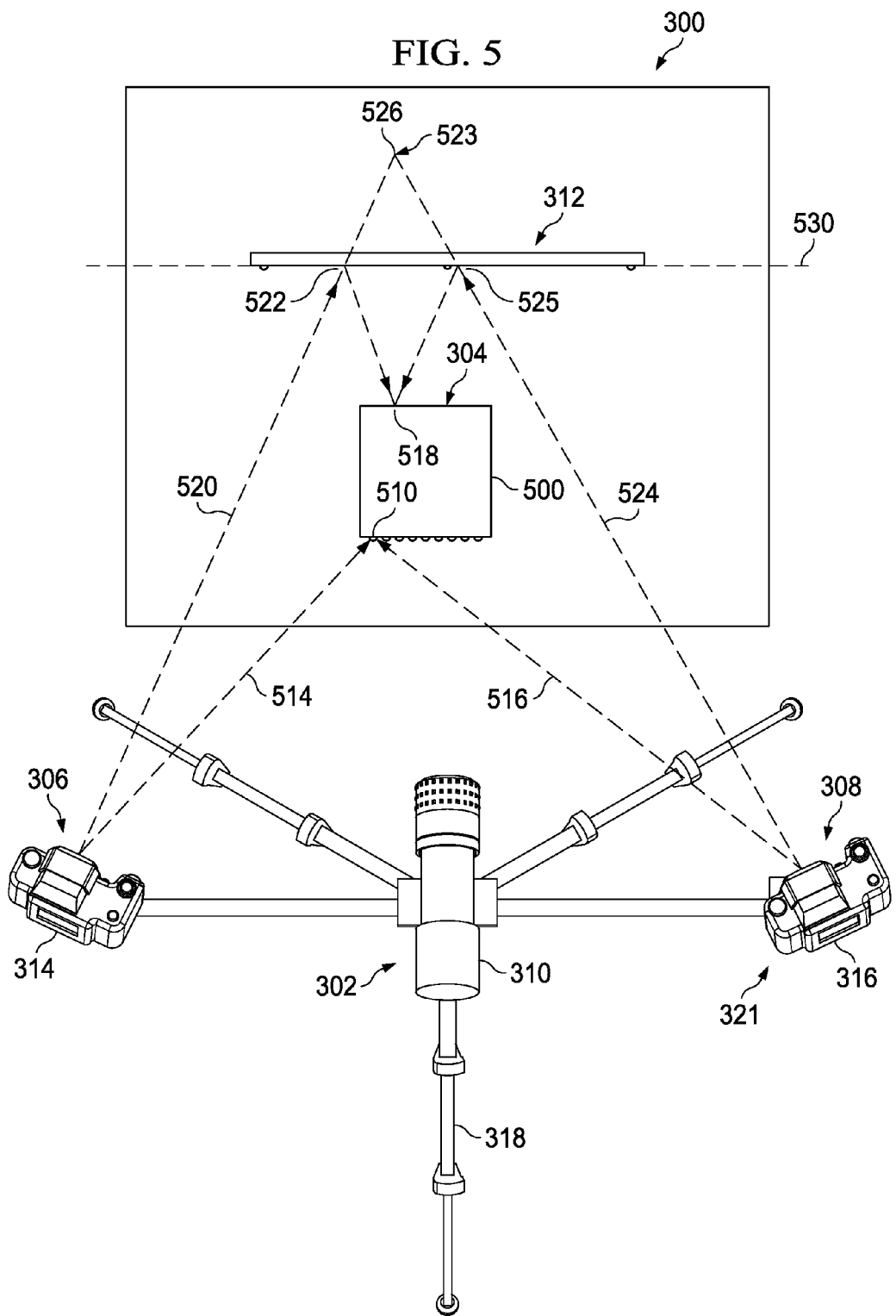
FIG. 5 is an illustration of a measurement of hidden points in accordance with an advantageous embodiment.

With reference now to FIG. 5, an illustration of a measurement of hidden points is depicted in accordance with an advantageous embodiment. In this illustrative example, the first camera 314 and the second camera 316 in FIG. 3 are positioned relative to the object 304.

The object 304 has a surface 500. The mirror unit 312 is positioned behind the object 304 relative to the first camera 314 and the second camera 316. In this illustrative example, the first camera 314 and the second camera 316 may generate images of a first point 510 to identify the coordinate for the first point 510.

The first camera 314 has a first line of sight 514 to the first point 510, and the second camera 316 has a first line of sight 516 to the first point 510. In other words, the first point 510 is a visible point.

In these illustrative examples, it may also be desirable to identify the coordinates for a second point 518. The first camera 314 and the second camera 316, however, do not have a line of sight to the second point 518. In this illustrative example, the mirror unit 312 is positioned such that the second point 518 can be seen in the reflection on the mirror unit 312 by the first camera 314 and the second camera 316.

In this illustrative example, the first camera 314 has a second line of sight 520 from the first camera 314 to a point 522 on the mirror unit 312 where a reflection of the second point 518 can be seen in the mirror unit 312. The second camera 316 has a second line of sight 524 from the second camera 316 to a point 525 on the mirror unit 312 where a reflection of the second point 518 can be seen in the mirror unit 312.

An intersection 523 of the second line of sight 520 for the first camera 314 and the second line of sight 524 for the second camera 316 occurs at a point 526. The point 526 is a point in three-dimensional space in these examples. In this illustrative example, the point 526 may be rotated about 180 degrees relative to a plane 530 for the mirror unit 312. In other words, the point 526 may be inverted across the plane 530 of the mirror unit 312 to form a new point (not shown) such that a line through the point 526 and the new point (not shown) is substantially perpendicular to the plane 530 of the mirror unit 312.

The location of the point 526 after being rotated about 180 degrees relative to the plane 530 for the mirror unit 312 has a three-dimensional coordinate that is substantially the same as the three-dimensional coordinate for the second point 518. In other words, the location of the point 526 after being rotated is substantially the same location as the second point 518.

In this manner, coordinates of the first point 510 and the second point 518 may be measured using images generated by the camera system 308 without having to move or reposition any component in the photogrammetry system 306.

Figure 6:
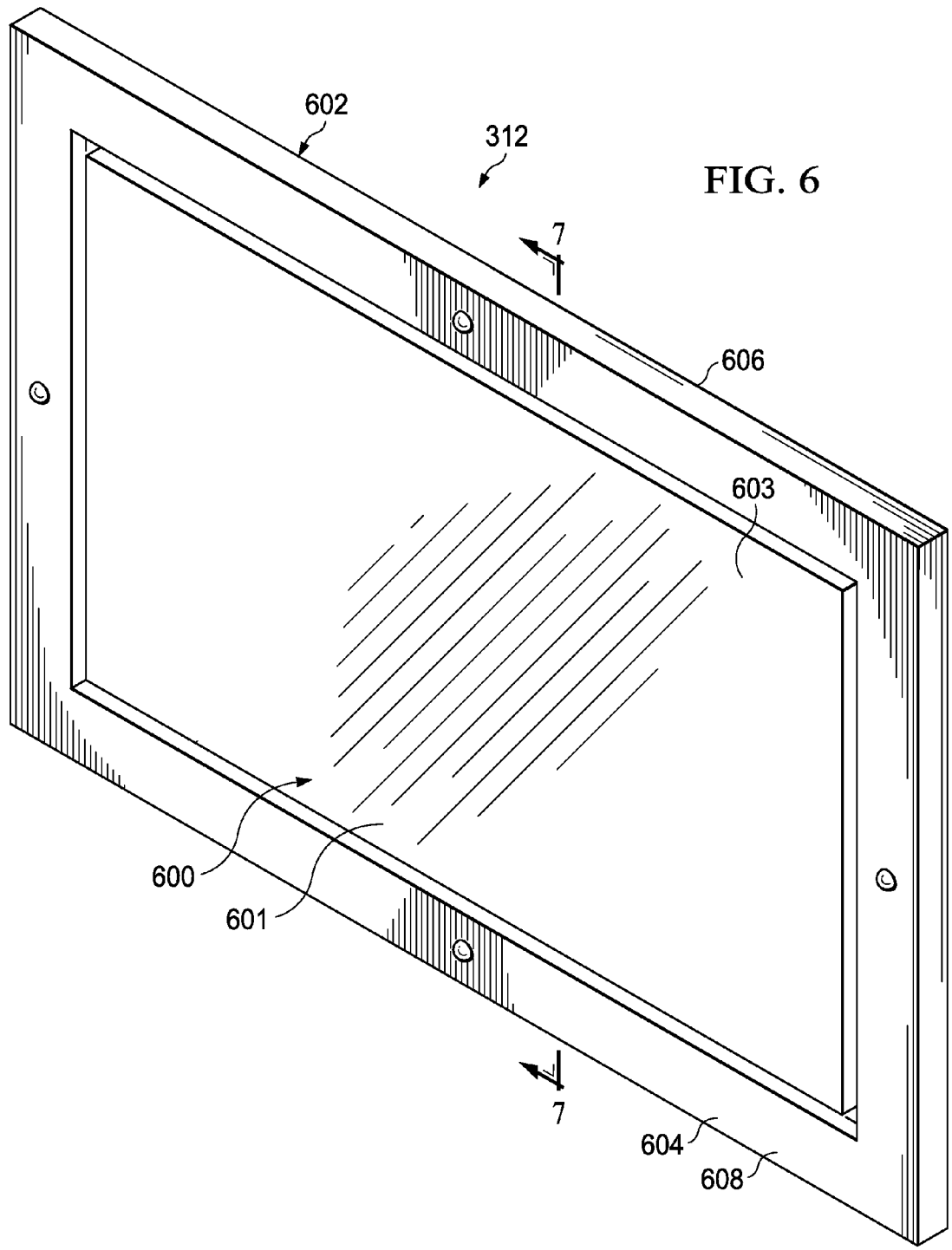
FIG. 6 is an illustration of a mirror unit in accordance with an advantageous embodiment.

With reference now to FIG. 6, an illustration of a mirror unit is depicted in accordance with an advantageous embodiment. In this illustrative example, the mirror unit 312 in FIG. 3 is depicted. The mirror unit 312 includes a mirror 600 and a frame 602.

In these illustrative examples, the mirror 600 has a surface 601, which is a reflective surface 603. In particular, the reflective surface 603 for the mirror 600 is the outermost surface of the mirror 600. In other words, other layers are not present on or above the reflective surface 603. For example, layers of glass, acrylic, and/or other materials are not present between this reflective surface 603 of the mirror 600 and the environment. When the mirror 600 has this type of configuration, the mirror 600 is referred to as a first surface mirror.

Of course, in other examples, other types of the mirror 600 may be used. For example, the surface 601 of the mirror 600 may not be reflective. In particular, the surface 601 may be glass and/or a coating material. When the mirror 600 has this type of configuration, the mirror 600 is referred to as a second surface mirror. With this configuration for the mirror 600, the thickness from the surface 601 of the mirror 600 to a layer having the reflective material in the mirror 600 is identified. This thickness is taken into account in identifying coordinates for the points 320 on the object 304 in FIG. 3.

As illustrated, the frame 602 is associated with the mirror 600. The frame 602 surrounds the mirror 600 and is configured to hold the mirror 600. In this illustrative example, the frame 602 has a first side 604 and a second side 606. A surface 608 of the first side 604 of the frame 602 is configured to be substantially coplanar with the mirror 600. In other words, the surface 601 of the mirror 600 and the surface 608 of the first side 604 of the frame 602 lie in substantially the same plane, such as the plane 530 in FIG. 5.

The frame 602 may be used to identify the position of the mirror 600 relative to an object, such as the object 304 in FIG. 3 and FIG. 5. For example, the scanner 310 in FIG. 3 projects the dots 319 onto the surface 608 of the frame 602 at the same time that the dots 319 are projected on the object 304 in FIG. 3 and FIG. 5. The dots 319 on the surface 608 of the frame 602 are used to identify the position of the plane through the frame 602 in three-dimensional space in these illustrative examples. When used in this manner, the dots 319 on the surface 608 of the frame 602 cause reference points on the surface 608 of the frame 602 to be visible in the images generated.

In this manner, the position of the surface 601 of the mirror 600 may also be identified because the surface 608 of the first side 604 of the frame 602 and the surface 601 of the mirror 600 are substantially coplanar. The dots 319 projected onto the surface 601 of the mirror 600 may not be used to identify the position of the mirror 600 because the mirror 600 reflects light.

Of course, in other illustrative examples, reference points for identifying the position of the surface 601 of the mirror 600 may be made visible using other techniques. For example, a frame 602 may be absent in the mirror unit 312. Instead, the mirror unit 312 may comprise the mirror 600 and a number of pieces of tape on the mirror 600.

The pieces of tape prevent light from being reflected at the locations of the pieces of tape on the mirror 600. In this manner, the dots 319 projected onto the pieces of tape may be on reference points that may be used for identifying the position of the surface 601 of the mirror 600. In some illustrative examples, paint, labels, tags, and/or other suitable types of markers may be placed on the reference points on the mirror 600.

In yet other illustrative example, reference points on tooling balls may used with the mirror 600. Dots 319 projected onto the tooling balls may allow the reference points to be visible. For example, a height of a tooling ball from a base or table on which the mirror 600 is placed to a center of the tooling ball may be known. In particular, this height along with a radius of the tooling ball and the dots 319 projected onto the tooling ball may be used to identify the position of the surface 601 of the mirror.

In this manner, any item connected to or attached to the mirror 600 may be used to provide markers on the reference points on the mirror 600 for identifying a position of the surface 601 of the mirror when the dimensions and/or coordinates for the item are known.

Figure 7:
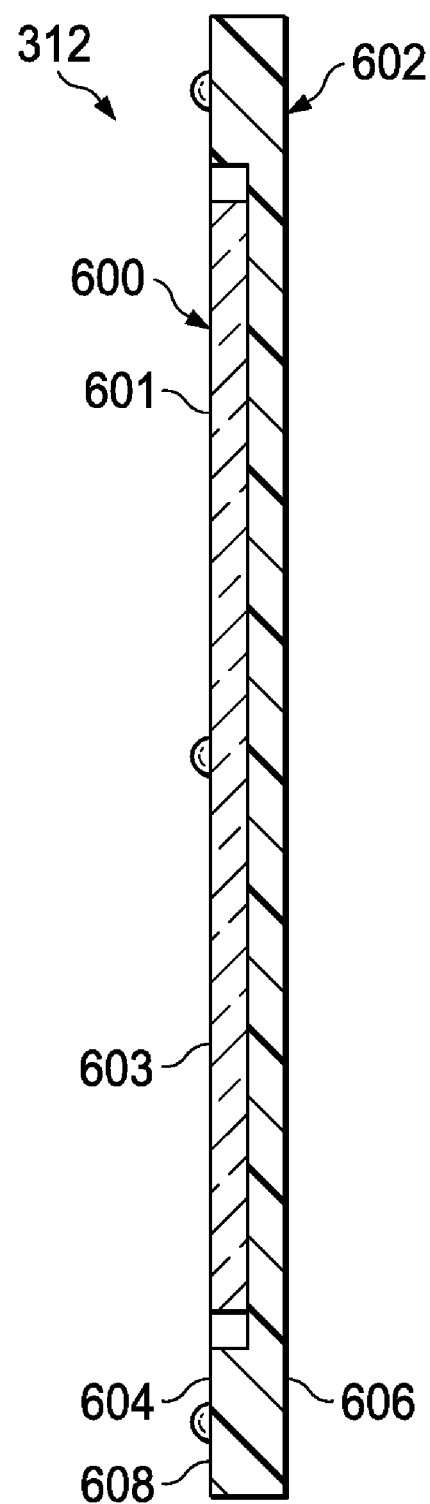
FIG. 7 is an illustration of a cross-sectional view of a mirror unit in accordance with an advantageous embodiment.

Turning now to FIG. 7, an illustration of a cross-sectional view of the mirror unit 312 is depicted in accordance with an advantageous embodiment. In this illustrative example, a cross-sectional view of the mirror unit 312 is depicted taken along lines 7-7 in FIG. 6.

Figure 8:
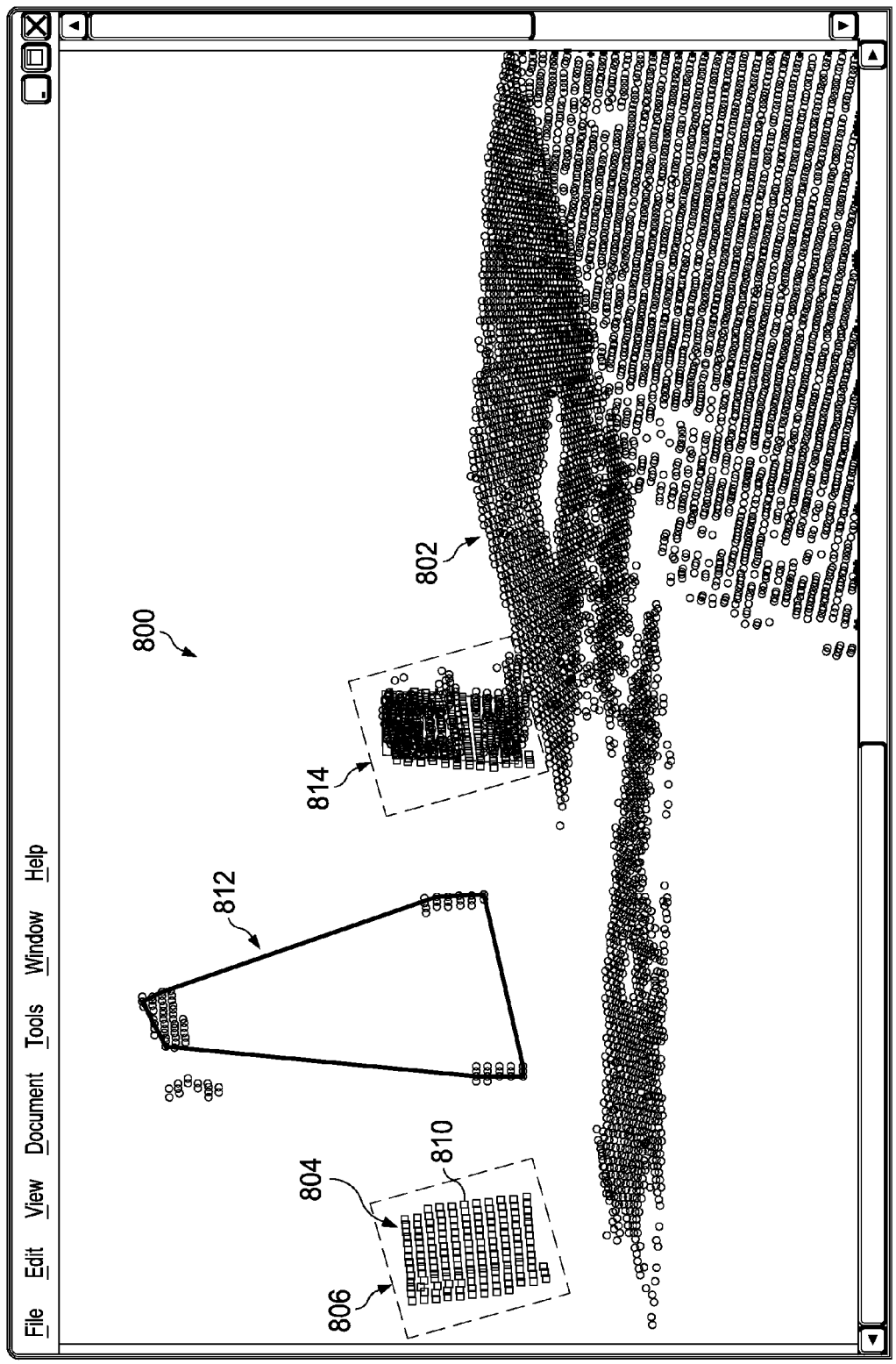
FIG. 8 is an illustration of a point cloud for a measurement environment in accordance with an advantageous embodiment.

With reference now to FIG. 8, an illustration of a point cloud for a measurement environment is depicted in accordance with an advantageous embodiment. In this illustrative example, a point cloud 800 is an example of one implementation for the point cloud 469 in FIG. 4. The point cloud 800 is generated by a measurement module, such as the measurement module 418 in FIG. 4 for the measurement environment 300 in FIG. 3.

In this depicted example, the point cloud 800 is a set of vertices in a three-dimensional coordinate system that represents the surface of the object 304 and other features within the measurement environment 300 in FIG. 3. These other features may include any structures, objects, and/or other components in the images generated by the camera system 308 other than object 304 in FIG. 3.

As illustrated, the point cloud 800 includes circular points 802 and rectangular points 804. In this illustrative example, the circular points 802 are generated for the visible portion 323 of the points 320 on the object 304 in FIG. 3. The circular points 802 are in locations in the three-dimensional coordinate system for the point cloud 800 that correspond to the locations of the visible portion 323 of the points 320 on the object 304 in FIG. 3.

Further, the rectangular points 804 are generated for the hidden portion 322 of the points 320 on the object 304 in FIG. 3. A portion of the rectangular points 804 forms a first group of points 806 in the point cloud 800. The first group of points 806 in the point cloud 800 are in locations in the three-dimensional coordinate system that correspond to the intersections of first lines of sight for the first camera 314 and second lines of sight for the second camera 316. The first lines of sight are between the first camera 314 and the points on the mirror unit 312 where the reflections of the hidden portion 322 of the points 320 on the object 304 can be seen on the mirror unit 312. The second lines of sight are between the second camera 316 and the points 320 on the mirror unit 312 where the reflections of the hidden portion 322 of the points 320 on the object 304 can be seen on the mirror unit 312.

As one illustrative example, a rectangular point 810 in the first group of points 806 is in a location in the point cloud 800 that corresponds to the location of the point 526 in FIG. 5. In other words, the rectangular point 810 is in a location that corresponds to the intersection of the second line of sight 520 for the first camera 314 in FIG. 5 and the second line of sight 524 for the second camera 316 in FIG. 5.

In this illustrative example, the plane formed by lines 812 represents the plane 530 for the mirror unit 312 in FIG. 5. A second group of points 814 in the point cloud 800 are formed by rotating the first group of points 806 by about 180 degrees relative to the plane formed by the lines 812. The second group of points 814 is in locations in the three-dimensional coordinate system for the point cloud 800 that corresponds to the locations of the hidden portion 322 of the points 320 on the object 304 in FIG. 3.

In this manner, three-dimensional coordinates may be generated for both the visible portion 323 and the hidden portion 322 of points 320 on the object 304 in FIG. 3.

Figure 9:
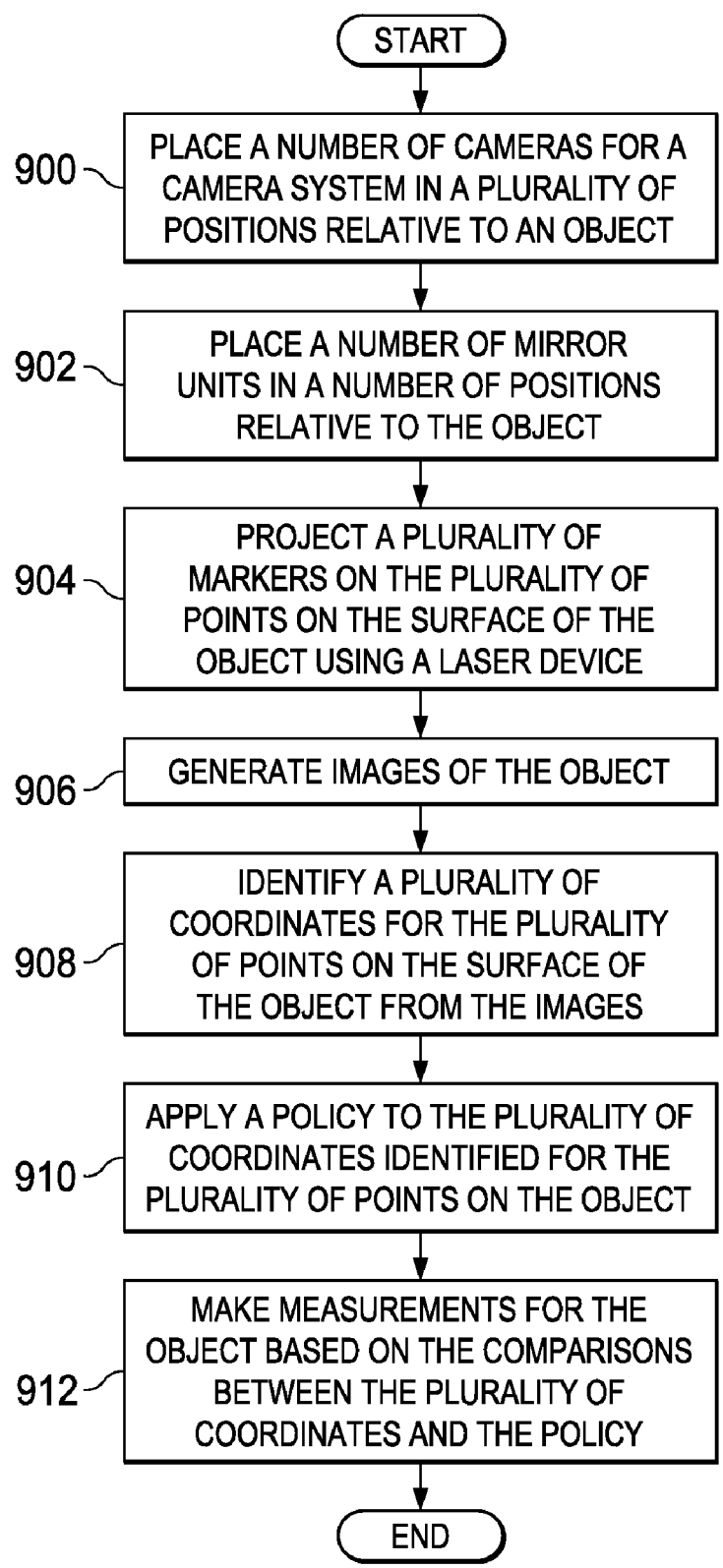
FIG. 9 is an illustration of a flowchart of a process for making measurements for an object in accordance with an advantageous embodiment.

With reference now to FIG. 9, an illustration of a flowchart of a process for making measurements for an object is depicted in accordance with an advantageous embodiment. The process illustrated in FIG. 9 may be implemented using the measurement system 402 in FIG. 4.

The process begins by placing a number of cameras 420 for a camera system 414 in a plurality of positions 440 relative to an object 406 (operation 900). The camera system 414 is part of a measurement system 402, which is a photogrammetry system 412 in these illustrative examples. In this illustrative example, the number of cameras 420 is two cameras. However, in other illustrative examples, the number of cameras 420 may be one, three, or some other suitable number of cameras.

A first portion 442 of a plurality of points 408 on a surface 410 of the object 406 is visible to the camera system 414. This first portion 442 of the plurality of points 408 is a number of visible points 444. Images 430 of the object 406 generated by the camera system 414 include the number of visible points 444.

Thereafter, a number of mirror units 422 are placed in a number of positions 452 relative to the object 406 (operation 902). In this illustrative example, one mirror unit is positioned relative to the object 406. The number of positions 452 for the number of mirror units 422 is selected such that a second portion 446 of the plurality of points 408 on the surface 410 of the object 406 that are hidden to the camera system 414 have a number of reflections 454 on the number of mirror units 422 that are seen in the images 430 generated by the camera system 414. This second portion 446 of the plurality of points 408 on the surface 410 of the object 406 that is hidden to the camera system 414 is a number of hidden points 448.

Next, a plurality of markers 432 is projected on the plurality of points 408 on the surface 410 of the object 406 using a laser device 433 (operation 904). The plurality of markers 432 are dots, such as the dots 319 in FIG. 3, in this illustrative example. Then, the camera system 414 generates images 430 of the object 406 (operation 906). These images 430 include the number of visible points 444 and the number of reflections 454 of the number of hidden points 448 on the number of mirror units 422.

A measurement module 418 identifies a plurality of coordinates 458 for the plurality of points 408 on the surface 410 of the object 406 from the images 430 (operation 908). The plurality of coordinates are identified for both the number of visible points 444 on the surface 410 of the object 406 and the number of hidden points 448 on the surface 410 of the object 406. In this illustrative example, the plurality of coordinates are three-dimensional coordinates based on a Cartesian coordinate system.

Operation 908 may be performed using a number of reference points 455 for the number of mirror units 422. The number of reference points 455 are visible in the images 430.

Thereafter, the measurement module 418 applies a policy 464 to the plurality of coordinates 458 identified for the plurality of points 408 on the object 406 (operation 910). In operation 910, the measurement module 418 compares the plurality of coordinates 458 to a number of rules 466 and/or criteria specified in the policy 464.

The measurement module 418 then makes measurements 404 for the object 406 based on the comparisons between the plurality of coordinates 458 and the policy 464 (operation 912), with the process terminating thereafter. These measurements 404 may include, for example, whether or not the object 406 meets the policy 464 within tolerances, how closely the locations for the plurality of points 408 on the object 406 are to desirable ranges for the plurality of points 406 on the object 406, and/or other suitable types of measurements.

Figure 10:
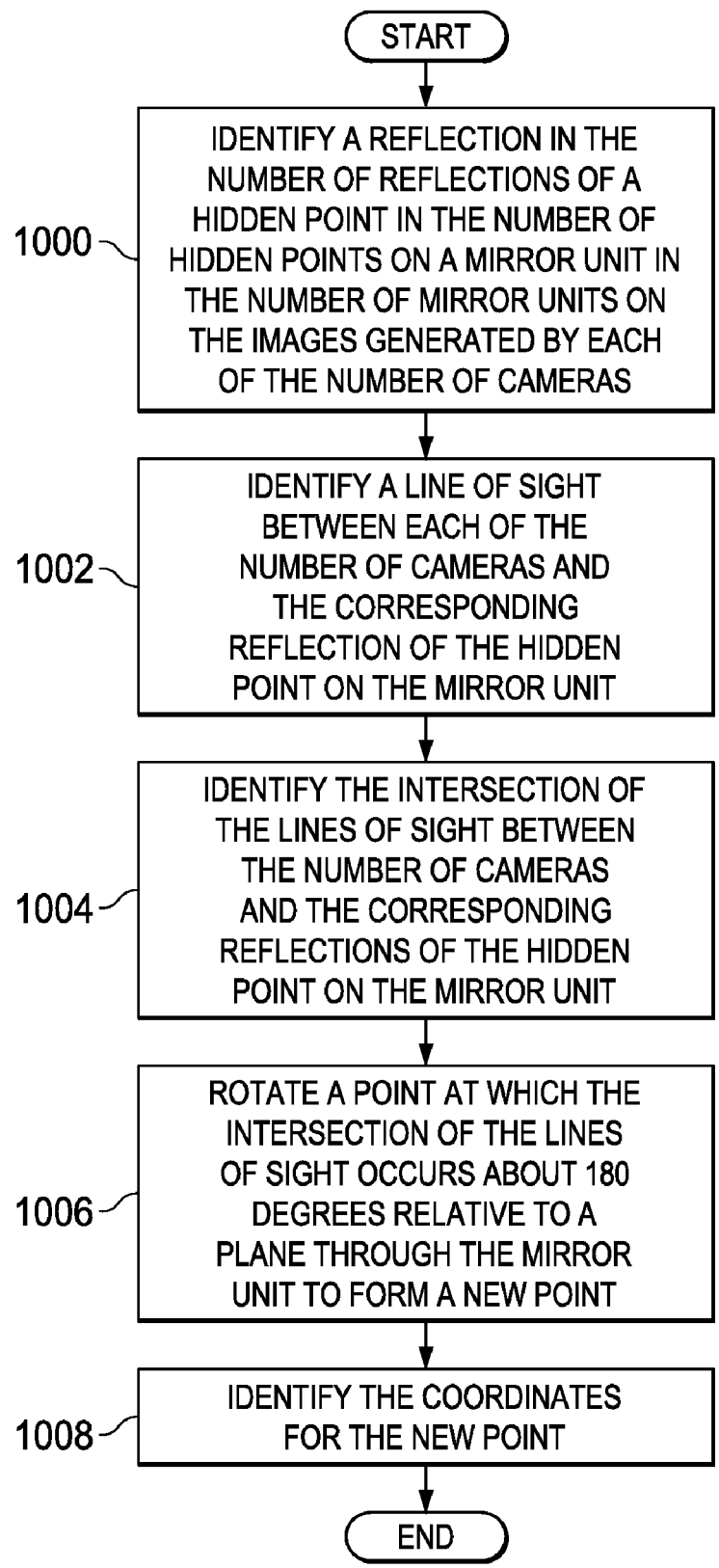
FIG. 10 is an illustration of a flowchart of a process for identifying a coordinate for a hidden point on an object in accordance with an advantageous embodiment.

With reference now to FIG. 10, an illustration of a flowchart of a process for identifying a coordinate for a hidden point on an object is depicted in accordance with an advantageous embodiment. The process illustrated in FIG. 10 may be used in implementing operation 908 in FIG. 9 to identify coordinates for the plurality of points 408 on the surface 410 of the object 406. Further, this process may be implemented using measurement module 418 in FIG. 4.

The process begins by identifying a reflection in the number of reflections 454 of a hidden point in the number of hidden points 448 on a mirror unit in the number of mirror units 422 in the images 430 generated by each of the number of cameras 420 (operation 1000).

The process identifies a line of sight between each of the number of cameras 420 and the corresponding reflection of the hidden point on the mirror unit (operation 1002). As one illustrative example, the lines of sight identified in operation 1002 may be, for example, second line of sight 520 for camera 314 and second line of sight 524 for camera 316 in FIG. 5. Operation 1002 may be performed based on an identification of the plurality of positions 440 for the number of cameras 420 and the position in the number of positions 452 of the mirror unit.

Next, the process identifies the intersection of the lines of sight between the number of cameras 420 and the corresponding reflections of the hidden point on the mirror unit (operation 1004). The intersection may be, for example, the intersection 523 in FIG. 5.

The process then rotates a point at which the intersection of the lines of sight occurs about 180 degrees relative to a plane through the mirror unit to form a new point (operation 1006). The point at which the intersection occurs may be, for example, point 526 in FIG. 5.

Thereafter, the process identifies the coordinates for the new point (operation 1008), with the process terminating thereafter. The coordinates for the new point correspond to the location of the hidden point on the object 406. In other words, in operation 1008, the process identifies the coordinates for the hidden point on the surface 410 of the object 406.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

For example, in some illustrative examples, the number of cameras 420 used in operation 900 in FIG. 9 may be one camera. When only one camera is used, operation 900 may be performed together with operation 906 after operation 904 in FIG. 9. For example, after operation 904, the camera may be placed in one position in the plurality of positions 440 in operation 900 and then an image of the images 430 of the object 406 may be generated in operation 906 in FIG. 9. Thereafter, the camera may be moved into another position in the plurality of positions 440 to generate another image of the object 406.

In this manner, in operation 900 and operation 906 in FIG. 9, the camera may be moved to the different positions in the plurality of positions 440 to generate the images 430 of the object.

Thus, the different advantageous embodiments provide a method and apparatus for making measurements for an object 406. In one advantageous embodiment, an apparatus comprises a number of mirror units 422, a number of cameras 420, and a measurement module 418. The number of mirror units 422 is configured to be positioned relative to the object 406. The number of cameras 420 is configured to generate images 430 of the object 406 and the number of mirror units 422 in which a plurality of points 408 on the object 406 is present in the images 430.

A first portion 442 of the plurality of points 408 is visible to the number of cameras 420 on the object 406. A second portion 446 of the plurality of points 408 is hidden to the number of cameras 420. A number of reflections 454 of the second portion 446 of the plurality of points 408 is visible on the number of mirror units 422 in the images 430. The measurement module 418 is configured to identify a plurality of coordinates 458 for the plurality of points 408 using the images 430, a plurality of positions 440 for the number of cameras 420 relative to the object 406, and a number of positions 452 for the number of mirror units 422.

In this manner, the different advantageous embodiments provide a measurement system 402 configured to identify the plurality of coordinates 458 for both a number of visible points 444 and a number of hidden points 448 on the surface 410 of the object 406 without needing to move the camera system 414 generating the images 430 of the object 406, or any other components of the measurement system 402. This type of measurement system 402 reduces the overall time and effort needed for making measurements of objects.

Turning now to FIG. 11, an illustration of a data processing system is depicted in accordance with an advantageous embodiment. In this illustrative example, a data processing system 1100 may be used in implementing the computer system 456 in FIG. 4. As depicted, the data processing system 1100 includes a communications fabric 1102, which provides communications between a processor unit 1104, a memory 1106, a persistent storage 1108, a communications unit 1110, an input/output (I/O) unit 1112, and a display 1114.

The processor unit 1104 serves to execute instructions for software that may be loaded into the memory 1106. The processor unit 1104 may be a number of processors, a multi-processor core, or some other type of processor, depending on the particular implementation. A number, as used herein with reference to an item, means one or more items. Further, the processor unit 1104 may be implemented using a number of heterogeneous processor systems in which a main processor is present with secondary processors on a single chip.

The memory 1106 and the persistent storage 1108 are examples of storage devices 1116. A storage device is any piece of hardware that is capable of storing information, such as, for example, without limitation, data, program code in functional form, and/or other suitable information either on a temporary basis and/or a permanent basis. The storage devices 1116 may also be referred to as computer readable storage devices in these examples. The memory 1106, in these examples, may be, for example, a random access memory or any other suitable volatile or non-volatile storage device. The persistent storage 1108 may take various forms, depending on the particular implementation.

For example, the persistent storage 1108 may contain one or more components or devices. For example, the persistent storage 1108 may be a hard drive, a flash memory, a rewritable optical disk, a rewritable magnetic tape, or some combination of the above. The media used by the persistent storage 1108 may also be removable. For example, a removable hard drive may be used for the persistent storage 1108.

The communications unit 1110, in these examples, provides for communications with other data processing systems or devices. In these examples, the communications unit 1110 is a network interface card. The communications unit 1110 may provide communications through the use of either or both physical and wireless communications links.

The input/output unit 1112 allows for input and output of data with other devices that may be connected to the data processing system 1100. For example, the input/output unit 1112 may provide a connection for user input through a keyboard, a mouse, and/or some other suitable input device. Further, the input/output unit 1112 may send output to a printer. The display 1114 provides a mechanism to display information to a user.

Instructions for the operating system, applications, and/or programs may be located in the storage devices 1116, which are in communication with the processor unit 1104 through the communications fabric 1102. In these illustrative examples, the instructions are in a functional form on the persistent storage 1108. These instructions may be loaded into the memory 1106 for execution by the processor unit 1104. The processes of the different advantageous embodiments may be performed by the processor unit 1104 using computer implemented instructions, which may be located in a memory, such as the memory 1106.

These instructions are referred to as program code, computer usable program code, or computer readable program code that may be read and executed by a processor in the processor unit 1104. The program code in the different advantageous embodiments may be embodied on different physical or computer readable storage media, such as the memory 1106 or the persistent storage 1108.

Program code 1118 is located in a functional form on a computer readable media 1120 that is selectively removable and may be loaded onto or transferred to the data processing system 1100 for execution by the processor unit 1104. The program code 1118 and the computer readable media 1120 form a computer program product 1122 in these examples. In one example, the computer readable media 1120 may be a computer readable storage media 1124 or a computer readable signal media 1126. The computer readable storage media 1124 may include, for example, an optical or magnetic disk that is inserted or placed into a drive or other device that is part of the persistent storage 1108 for transfer onto a storage device, such as a hard drive, that is part of the persistent storage 1108. The computer readable storage media 1124 may also take the form of a persistent storage, such as a hard drive, a thumb drive, or a flash memory, that is connected to the data processing system 1100.

Alternatively, the program code 1118 may be transferred to the data processing system 1100 using the computer readable signal media 1126. The computer readable signal media 1126 may be, for example, a propagated data signal containing the program code 1118. For example, the computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for the data processing system 1100 are not meant to provide architectural limitations to the manner in which different advantageous embodiments may be implemented. The different advantageous embodiments may be implemented in a data processing system including components in addition to or in place of those illustrated for the data processing system 1100.

Other components shown in FIG. 11 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, the processor unit 1104 may take the form of a hardware unit that has circuits that are manufactured or configured for a particular use. This type of hardware may perform operations without needing program code to be loaded into a memory from a storage device to be configured to perform the operations.

For example, when the processor unit 1104 takes the form of a hardware unit, the processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, programmable array logic, a field programmable logic array, a field programmable gate array, and other suitable hardware devices. With this type of implementation, the program code 1118 may be omitted because the processes for the different advantageous embodiments are implemented in a hardware unit.

In still another illustrative example, the processor unit 1104 may be implemented using a combination of processors found in computers and hardware units. The processor unit 1104 may have a number of hardware units and a number of processors that are configured to run the program code 1118. With this depicted example, some of the processes may be implemented in the number of hardware units, while other processes may be implemented in the number of processors.

In another example, a bus system may be used to implement the communications fabric 1102 and may be comprised of one or more buses, such as a system bus or an input/output bus. Of course, the bus system may be implemented using any suitable type of architecture that provides for a transfer of data between different components or devices attached to the bus system.

The description of the different advantageous embodiments has been presented for purposes of illustration and description, and is not intended to be exhaustive or limited to the advantageous embodiments in the form disclosed. Many modifications and variations will be apparent to those of ordinary skill in the art. Further, different advantageous embodiments may provide different advantages as compared to other advantageous embodiments. The advantageous embodiment or embodiments selected are chosen and described in order to best explain the principles of the advantageous embodiments, the practical application, and to enable others of ordinary skill in the art to understand the disclosure for various embodiments with various modifications as are suited to the particular use contemplated.

What is claimed is:

1. An apparatus comprising:
   a number of minor units configured to be positioned relative to an object;
   a number of cameras configured to generate images of the object and the number of minor units in which a plurality of points on the object is present in the images, wherein a first portion of the plurality of points on the object is visible on the object in the images and a second portion of the plurality of points on the object is visible on the number of minor units in the images; and
   a measurement module configured to identify a plurality of coordinates for the plurality of points using the images, a plurality of positions for the number of cameras relative to the object, a number of reference points in the images, and a number of positions for the number of minor units in which the plurality of coordinates for the plurality of points on the object are used to form a substantially spatially correct point cloud for the object.

2. The apparatus of claim 1 further comprising:
   a laser device configured to generate a plurality of markers on the plurality of points, wherein the plurality of markers on the plurality of points is visible in the images.

3. The apparatus of claim 1, wherein a mirror unit in the number of minor units comprises:
   a mirror having a first surface; and
   a frame surrounding the mirror and having a second surface, wherein the frame is configured to hold the mirror such that the first surface is substantially coplanar with the second surface and wherein at least a portion of the number of reference points are on the frame in the images.

4. The apparatus of claim 1, wherein in identifying the plurality of coordinates for the plurality of points using the images, the measurement module is configured to identify an intersection of lines of sight for the number of cameras, wherein each of the lines of sight is between a camera in the number of cameras and a reflection of a point in the second portion of the plurality of points on a minor unit in the number of mirror units; rotate the point at which the intersection occurs about 180 degrees relative to a plane for the mirror unit to form a new point; and identify a coordinate for the new point.

5. The apparatus of claim 1, wherein the measurement module is configured to apply a policy to the plurality of coordinates for the plurality of points.

6. The apparatus of claim 1, wherein points in the substantially spatially correct point cloud have substantially same locations as corresponding points in the plurality of points on the object when the points in the substantially spatially correct point cloud are aligned with the corresponding points in the plurality of points on the object.

7. The apparatus of claim 6, wherein the measurement module is configured to generate a model of the object using the substantially spatially correct point cloud.

8. The apparatus of claim 7, wherein the measurement module is configured to compare the model of the object with another model of the object and identify a number of differences between the model of the object and the another model of the object.

9. The apparatus of claim 1, wherein a line of sight for a camera in the number of cameras between the camera and a point in the second portion of the plurality of points is absent.

10. The apparatus of claim 1, wherein the first portion of the plurality of points is a number of visible points and the second portion of the plurality of points is a number of hidden points in which the number of hidden points are hidden from a direct view of the number of cameras.

11. A method for making measurements, the method comprising:
generating images of an object;
identifying a plurality of coordinates for a plurality of points on a surface of the object from the images using a number of reference points in the images, wherein a first portion of the plurality of points on the object is visible on the object in the images, a second portion of the plurality of points on the object is visible on a number of mirror units in the images; and
generating a substantially spatially correct point cloud for the object using the plurality of coordinates for the plurality of points, wherein points in the substantially spatially correct point cloud have substantially the same locations as corresponding points in the plurality of points on the object when the points in the substantially spatially correct point cloud are aligned with the corresponding points in the plurality of points on the object.

12. The method of claim 11 further comprising:
generating a plurality of markers on the plurality of points on the surface of the object using a laser device.

13. The method of claim 11, wherein the generating step is performed using a number of cameras and wherein the step of identifying the plurality of coordinates for the plurality of points on the surface of the object from the images comprises:
identifying an intersection of lines of sight for the number of cameras, wherein each of the lines of sight is between a camera in the number of cameras and a reflection of a point in the second portion of the plurality of points on a mirror unit in the number of mirror units;
rotating the point at which the intersection occurs about 180 degrees relative to a plane for the mirror unit to form a new point; and
identifying a coordinate for the new point.

14. The method of claim 11 further comprising:
generating a model for the object using the substantially spatially correct point cloud.

15. The method of claim 14 further comprising:
comparing the model of the object with another model of the object; and
identifying a number of differences between the model of the object and the another model of the object.

16. The method of claim 11
wherein a mirror unit in the number of mirror units comprises a mirror having a first surface and a frame surrounding the mirror and having a second surface, wherein the frame is configured to hold the mirror such that the first surface is substantially coplanar with the second surface and wherein at least a portion of the number of reference points are on the frame in the images.

17. The method of claim 11, wherein the generating step is performed using a number of cameras and wherein a line of sight for a camera in the number of cameras between the camera and a point in the second portion of the plurality of points is absent.

18. The method of claim 11, wherein the first portion of the plurality of points is a number of visible points and the second portion of the plurality of points is a number of hidden points in which the number of hidden points is hidden from a direct view of a number of cameras configured to generate the images of the object.

19. An apparatus comprising:
a number of mirror units configured to be positioned relative to an object;
a number of cameras configured to generate images of the object and the number of mirror units in which a plurality of points on the object is present in the images; and
a measurement module configured to identify a plurality of coordinates for the plurality of points using a number of reference points in the images, a first portion of the plurality of points on the object visible on the object in the images, and a second portion of the plurality of points on the object visible on the number of mirror units in the images, and configured to generate a point cloud for the object using the plurality of coordinates for the plurality of points, wherein points in the point cloud have substantially the same locations as corresponding points in the plurality of points on the object when the points in the point cloud are aligned with the corresponding points in the plurality of points on the object.

* * * * *